Figure 1:
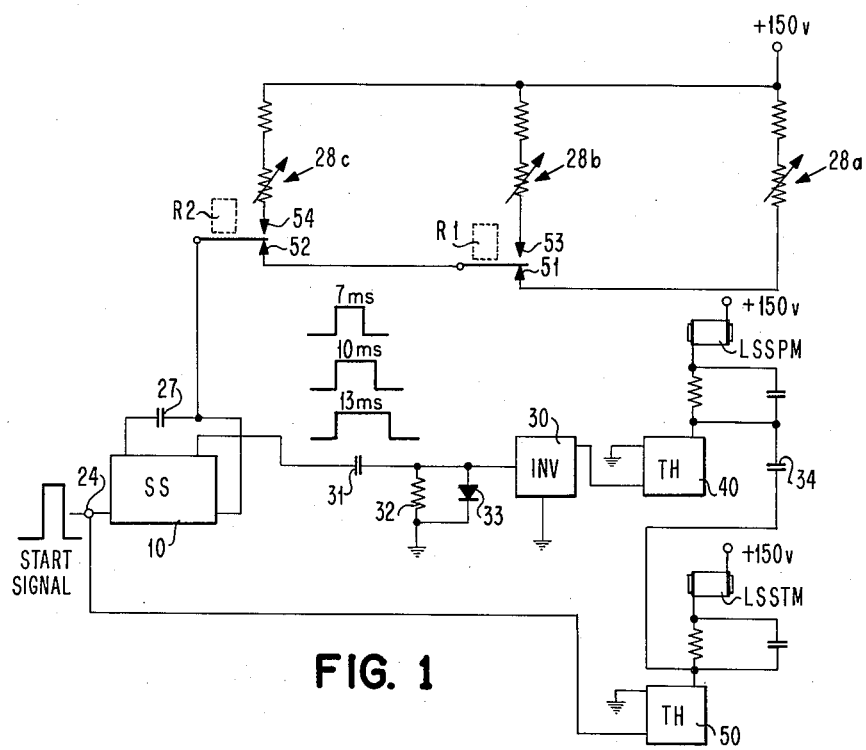

Dec. 6, 1960    P. ANDREESSEN ET AL    2,963,139
LINE SPACING CONTROL FOR RECORD FEEDING DEVICES
Filed Feb. 24, 1959    4 Sheets-Sheet 1

*INVENTORS*
PAUL ANDREESSEN
ARTHUR J. FOLMAR

BY Donald F. Voss
*ATTORNEY*

United States Patent Office 2,963,139
Patented Dec. 6, 1960

2,963,139

LINE SPACING CONTROL FOR RECORD FEEDING DEVICES

Paul Andreessen, Vestal, and Arthur J. Folmar, Endicott, N.Y., assignors to International Business Machines Corporation, New York, N.Y., a corporation of New York Filed Feb. 24, 1959, Ser. No. 795,148

12 Claims. (Cl. 197—133)

This invention relates to control apparatus for record feeding devices and, more particularly, to control apparatus for controlling the line spacing operation of record feeding devices.

Record feeding devices for feeding records such as continuous forms in printing machines, usually have the facility to line space the form for various number of line spaces. The controls for the line spacing of record feeding devices differ considerably depending upon the speed of operation of the record feeding device.

Heretofore, in high-speed record feeding devices, it was customary to control the line spacing mechanism by means of a commutator and cooperating brush elements which, in combination, function to develop a stop impulse. The stop impulse is then transmitted to the mechanism, such as magnetically operated clutches, for controlling the record feeding means. For example, the line spacing mechanism disclosed in the patent to F. J. Furman et al. No. 2,842,246, dated July 8, 1958, is controlled by a commutator and three brushes cooperating therewith and so arranged that a first brush is directly on a segment of the commutator. A second brush is spaced one interval or line space removed from the segment, and a third brush is spaced two intervals removed from the segment under the first brush.

The segments and brushes of the line space control mechanism are arranged to have a flexible control whereby any one brush may be the one contacting the segment of the commutator; however, the segments of the commutator are so arranged there will always be one brush in contact with one of the segments of the commutator. The line spacing control brushes are connected through circuitry to electronic devices for high-speed control of magnetically operated start-stop random type clutches.

The type of line spacing which is to take place is under control of the machine operator by means of pluggable connections. Hence, the operator of the machine may then, by making the proper pluggable connections, call for one, two or three line spaces as desired. The commutator moves in a direct relationship with respect to the record feeding device.

If single line spacing is to occur, then the commutator moves one space to bring the segment under a brush one line space away from the other brush which had been resting on the commutator segment. It would be possible that the next operation would require double line spacing. As the record feeding device moves the continuous form for two line spaces, the commutator is also moved two line spaces and another segment will be brought underneath one of the brushes which had functioned previously to effect single line spacing. Hence, a particular brush may function at any one moment for single line spacing, at another moment for double line spacing, and at still another moment for triple line spacing. Therefore, it is difficult to adjust any one brush for any particular line spacing and a precise adjustment usually cannot be made for all three types of line spacing; i.e., single, double or triple. Further, the use of a brush and commutator arrangement presents wear problems.

The present invention is an improvement with respect to the line spacing control functions over record feeding devices. An adjustment may be made independently for single, double and triple line spacing. The line spacing control mechanism is independent of the record feeding apparatus and, therefore, while the control apparatus is related to the record feeding apparatus, it is not dependent thereon. By this arrangement, setting or adjustment of the apparatus for line spacing control may be made dynamically. Further, the present invention eliminates the problems, such as wear, attendant with brushes and commutators.

In the present invention, the impulse for starting the movement of the record feeding device is utilized to develop a stop impulse for stopping the movement of the record feeding device. In order to effect various degrees of line spacing, the start impulse for starting the record feeding device is selectively delayed for different predetermined periods of time to develop a stop impulse which will then stop the record feeding device to give the desired line spacing. The period of time for which the start impulse is delayed can be adjusted so that the record fed by the record feeding means will be properly arrested for the line spacing which is to take place. In this manner, the adjustment may be made dynamically or under operating conditions.

In this invention, magnets are utilized for controlling the starting and stopping of the record feeding device. At the same time that the start impulse is applied to the start magnet for the record feeding device, it is also applied to a single-shot multivibrator which then delays the start impulse for a predetermined period of time; and, after the impulse is delayed, it is applied to the stop magnet for controlling the stopping of the record feeding device. The time constant of the single-shot multivibrator is changed to delay the start impulse for different predetermined periods of time by bringing different resistance elements into the circuitry of the single-shot multivibrator; and, in this manner, it is possible to effect variable line spacing.

Accordingly, it is a principal object of the present invention to provide an improved line spacing control device for record feeding means.

Another very important object of the present invention is to provide line spacing control apparatus which controls record feeding means by delaying the start impulse to develop a stop impulse.

Still another important object of the invention is to provide line spacing control apparatus which may be adjusted dynamically.

Another object of the invention is to provide line spacing control mechanism which is relatively inexpensive.

Yet another object of the invention is to provide line spacing control mechanism which is relatively free of wear problems.

A further object of the invention is to provide line spacing control mechanism for record feeding devices which is not directly dependent upon the record feeding device for its operation.

Other objects of the invention will be pointed out in the following description and claims and illustrated in the accompanying drawings, which disclose, by way of examples, the principle of the invention and the best mode, which has been contemplated, of applying that principle.

Figure 2:
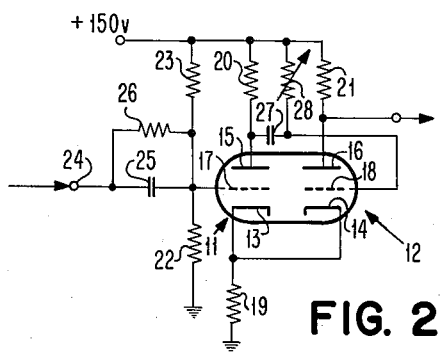
Figure 3:
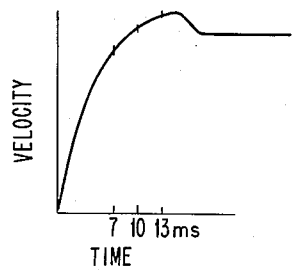
Figure 4:
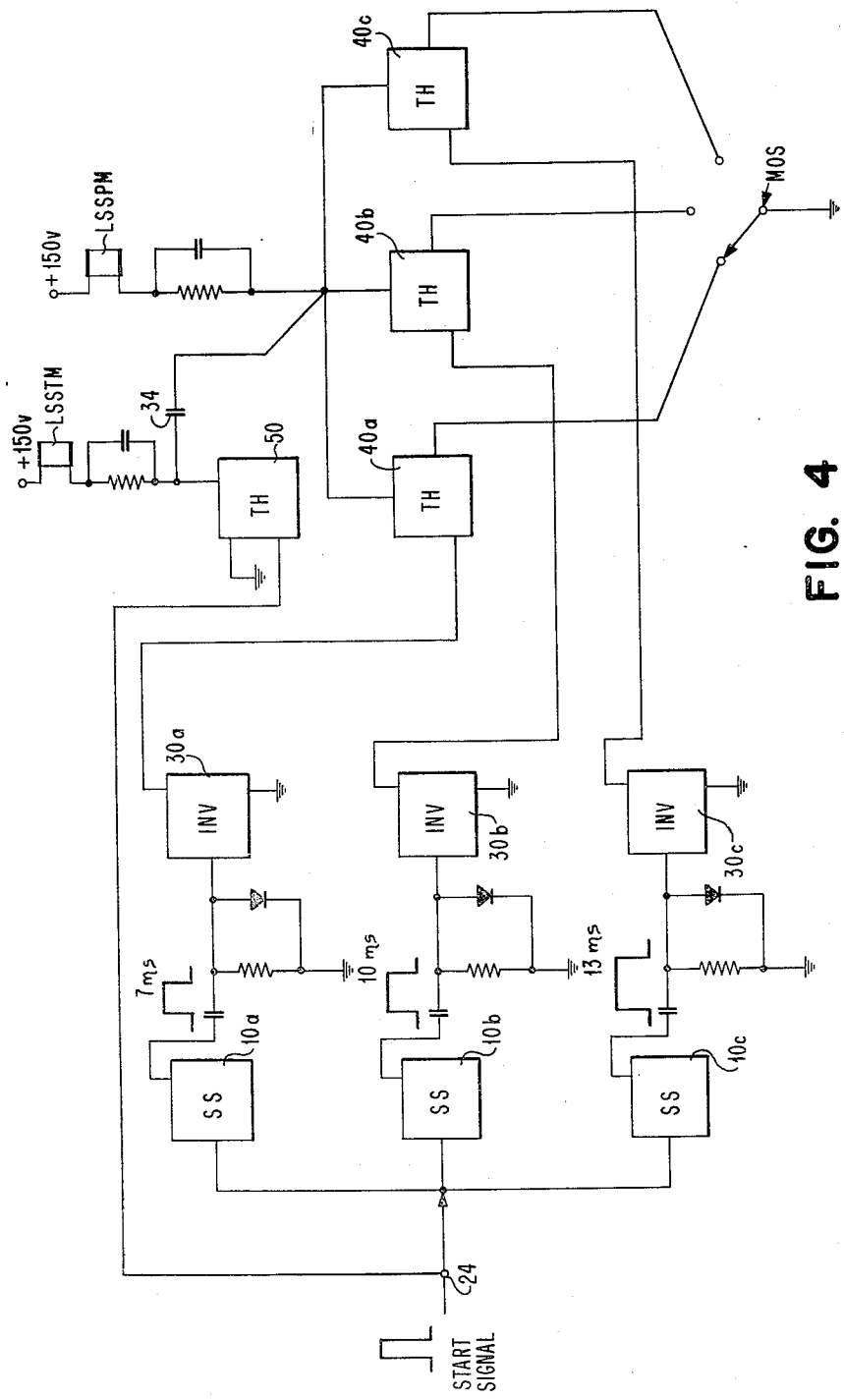
Figure 5:
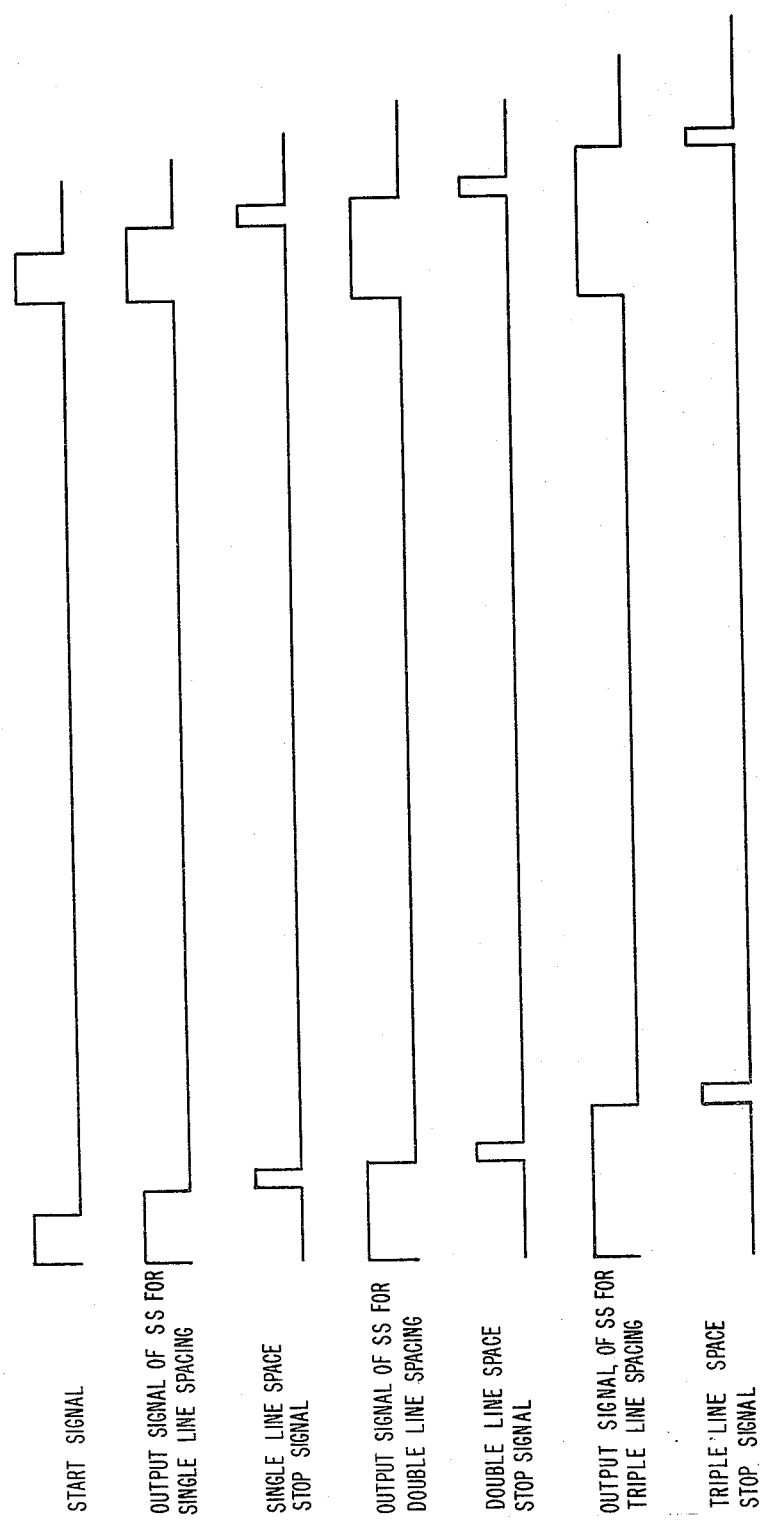
Figure 6:
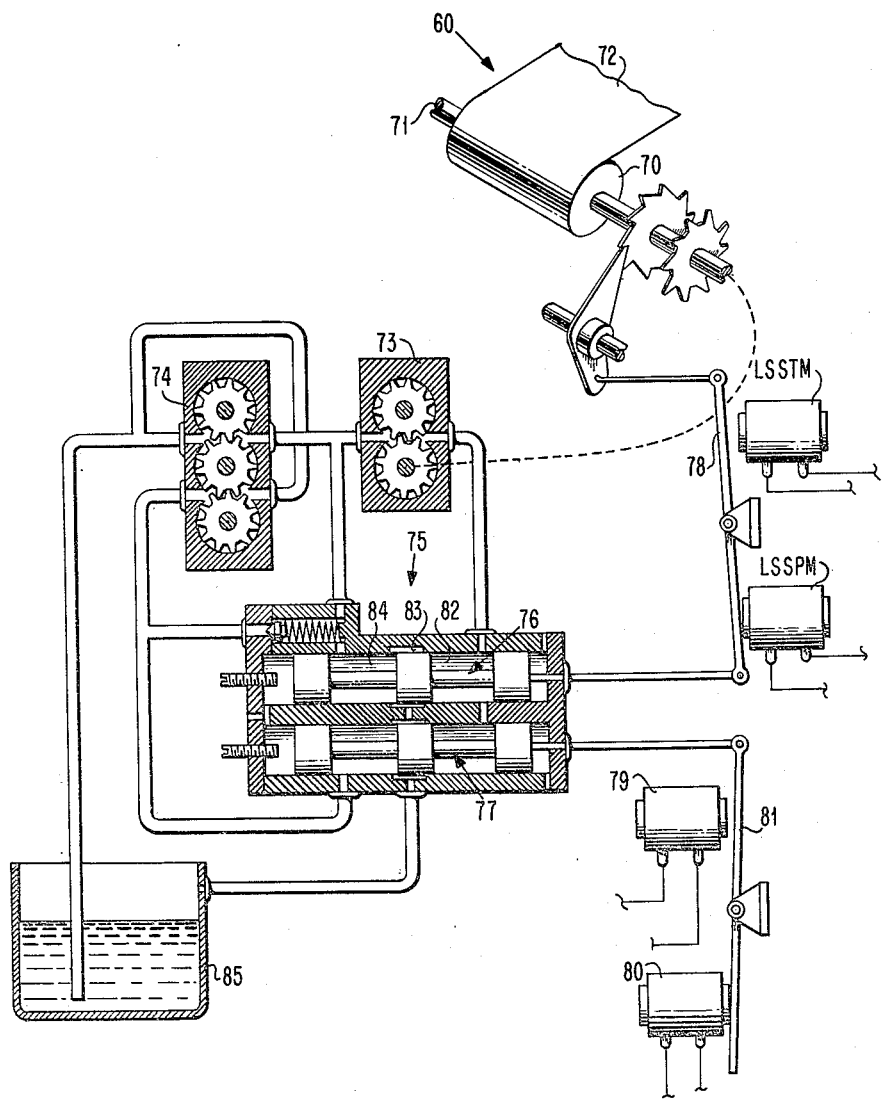

In the drawings:

Fig. 1 is a schematic diagram of the line spacing control circuitry,

Fig. 2 is a diagram showing the details of the single-shot multivibrator of Fig. 1, Fig. 3 is a diagram showing the velocity curve for the record feeding means, Fig. 4 is a schematic diagram of the line spacing control circuitry for another embodiment of the invention, Fig. 5 is a diagram of the waveforms involved in the operation of the line spacing control circuitry, and Fig. 6 is a schematic diagram of the drive arrangement for the record feeding means and the controls therefor.

Referring to the drawings, the invention is illustrated, by way of example, in Fig. 1 as a single-shot multivibrator 10 coupled to an inverter 30. The inverter 30 is connected to a thyratron 40 for controlling a line space stop magnet LSSPM. The line space stop magnet LSSPM, as will be seen later herein, effects the stopping of record feeding means 60, shown in Fig. 6. The starting of the record feeding means 60 is under control of a line space start magnet LSSTM, Figs. 1 and 6.

The line space start magnet LSSTM is under control of a thyratron 50, Fig. 1, which has its control electrode or grid connected to receive the start signal while its shield grid is connected to ground potential. The start signal is a positive-going signal applied to fire the thyratron 50 and thereby energize the start magnet LSSTM to start the record feeding means 60. The start signal is also applied to the single-shot multivibrator 10 which may be thought to function as delaying the start signal to develop a stop signal. Actually, the single-shot multivibrator 10, upon receiving a signal at its input, generates a signal at its output; the signal so generated starts with the application of the signal applied at the input, but terminates a predetermined time later. The stop signal developed by the single-shot multivibrator is applied to the inverter 30. The inverter 30 is biased to be normally conducting; hence, the leading or positive-going edge of the stop signal does not affect the conduction of the inverter 30; however, the trailing or negative-going edge of the stop signal cuts off the conduction of the inverter 30. As the inverter 30 stops conducting, the potential at its anode rises. The anode of the inverter 30 is connected to the control grid of the thyratron 40 which has its shield grid connected to ground. By this arrangement, the rise in potential at the anode of the inverter 30 causes the thyratron 40 to conduct and thereby energize the line space stop magnet LSSPM to cause the stopping of the record feeding means 60.

It is thus seen that the start signal starts the movement of the record feeding means 60 and also is delayed for a predetermined period of time to cause the stopping of the record feeding means 60. The single-shot multivibrator delays the start signal for the desired period of time to develop the stop signal. The trailing or negative-going edge of the stop signal is utilized to effectively stop the movement of the record feeding means 60.

The single-shot multivibrator 10, shown in detail in Fig. 2, consists of a pair of electron discharge devices 11 and 12 of the triode type, each respectively having a cathode 13 and 14, an anode 15 and 16, and a control electrode or grid 17 and 18. The electrodes of the electron discharge devices 11 and 12 may be contained in a single envelope. The cathodes 13 and 14 are connected together and are further connected through a common resistance element 19 to ground potential. The anodes 15 and 16 are connected through resistance elements 20 and 21, respectively, to a positive potential such as +150 volts to maintain the anodes positive with respect to the cathodes. The control electrode 17 of the triode 11 is connected to ground potential through a resistance element 22 which is in series with a resistance element 23 connected to the +150 volt supply.

An input terminal 24 is connected to the control electrode 17 through a capacitance element 25 connected in parallel with a resistance element 26. Further, for a purpose that will become more clear shortly, control electrode 18 is connected to the plate 15 through a capacitance element 27 and to the +150 volt supply through a variable resistance element 28.

By the arrangement just described, a positive bias is normally maintained on the control electrode 18 of such value that the triode 12 conducts current and the resistance element 21 develops a potential drop at the anode 16. The resistance element 19 provides a drop in potential, when the triode 12 conducts, so that the cathode 13 is biased at a positive potential relative to the control electrode 17 whereby the triode 11 is held in a cut-off or nonconducting state and thus prevents anode 15 from drawing current. Anode 15, therefore, will normally be maintained at a potential substantially equal to the +150 volt supply. Thus, it is seen that anode 16, from which the output of the single-shot multivibrator 10 is taken, is at a relatively low potential; in fact, the resistance element 21 can be so chosen that the anode 16 or output potential is at approximately 50 volts when the triode 12 is conducting. Further, under these conditions, the triode 11 is held in the nonconductive state.

When a positive-going signal is applied to the input terminal 24, the potential of the control electrode 17 rises above the potential of the cathode 13 whereby the triode 11 conducts. As the triode 11 conducts, current is drawn, thereby causing a sudden potential drop at the anode 15. The extent of the potential drop at the anode 15 depends upon the value of the resistance element 20, which is to be of such value as to provide a comparatively large drop in potential following the instant the signal is applied to the input terminal. At the instant the potential at the anode 15 drops, a large negative impulse is transferred through the capacitance element 27 to the control electrode 18 of the triode 12 to drive the control electrode 18 sufficiently negative to abruptly stop the conduction of the triode 12. When the triode 12 ceases to conduct, the potential at the anode 16 rises from its substantial 50 volt value, assuming that 50 volts is the value created by the resistance element 21, to substantially the value of the +150 volt supply.

The period of time for which the anode 16 remains at substantially the supply voltage is independent of the signal at the input terminal 24. In fact, the determining factor is the time constant of the capacitance element 27 and the resistance element 28. The capacitance 27 and resistance 28 function to maintain the control electrode 18 sufficiently negatively biased for a period of time equal to the product of the values of the capacitance and resistance. Hence, the period of time for which the anode 16 may be maintained at a relatively high potential may be controlled by the time delay effected by the capacitance 27 and resistance 28.

During such time delay interval, the negative bias on control electrode 18 gradually leaks off; and, after a lapse of the predetermined period of time, the control electrode 18 will again be driven positive, whereby the triode 12 abruptly starts to conduct.

At the instant the triode 12 starts conducting, the potential of the cathode 13 rises above the potential of the control electrode 17 to cause the triode 11 to return to its normal nonconducting state. Under these conditions, the output potential of the single-shot multivibrator 10 falls to approximately 50 volts. Hence, by varying either the capacitance 27 or the resistance 28 or by switching capacitances and resistances of different values into the circuity, the period of time for which the output potential is maintained at substantially the supply voltage may be varied as desired.

In this example, the capacitance 27 is a fixed value while different resistance elements 28a, 28b and 28c, Fig. 1, are selectively switchable into the circuitry to perform the same function as the resistance element 28. The resistance elements 28a, 28b and 28c each have different values and are adjustable so as to permit a precise setting of the time delay period. Hence, as it will be seen shortly, the resistances 28a, 28b and 28c provide the proper time delay to effect single, double or triple line spacing as desired. Additionally, because these resistance elements are individually adjustable, it is possible to accurately adjust the line spacing for single, double and triple line spacing. Further, this adjustment may be made while the record feeding means 60 is in operation.

The resistance element 28a is of such value to effect single line spacing and is normally connected to the control electrode 18 through normally closed contacts 51 and 52 of relays R1 and R2. Associated with the normally closed contacts 51 and 52 are normally open contacts 53 and 54. The normally open contact 53 and the normally closed contact 52 function to connect only the resistance element 28b with the control electrode 18, while the normally open contact 54 makes it possible for only the resistance element 28c to be connected to the control electrode 18. The relays R1 and R2 may be selectively energized under control of a computer or other like device or by plugboard connections, not shown, under control of the machine operator.

As it will be seen shortly, to effect single line spacing, the relays R1 and R2 are both maintained deenergized whereas, for double line spacing, only the relay R1 is energized, while, for triple line spacing, only the relay R2 is energized. The resistance elements 28a, 28b and 28c, when individually connected to the control electrode 18, will cause the potential at the anode 16 to remain substantially at the potential of the +150 volt supply for periods of approximately seven, ten and thirteen milliseconds, respectively. The reason why the time delay periods are not whole multiples of each other is that the record feeding means 60, shown in Fig. 6, has an exponential increasing velocity, as shown by the diagram in Fig. 3.

The anode 16 of the triode 12, Fig. 1, is connected through a capacitance 31 to the control electrode of the inverter 30. A resistance element 32 connected in parallel with a crystal diode 33 connects the control electrode of the inverter 30 to ground potential. The crystal diode is connected to offer a low resistance path to ground so as to bias the control electrode of the inverter 30 at substantially ground potential whereby the inverter 30 is normally conducting. However, when a negative-going signal is applied to the control grid of the inverter 30, the crystal diode offers a high resistance path to ground potential; and, therefore, the potential drop is across the resistance element 32 whereby the control grid of the inverter 30 becomes negative with respect to its associated cathode which is at ground potential. Under these conditions, the inverter 30 momentarily stops conducting. As the inverter 30 stops conducting, the voltage at its plate rises. This rise in voltage causes the thyratron 40 to fire or conduct. The thyratron 40 has the line space stop magnet LSSPM connected in its anode or plate circuit; hence, as the thyratron 40 conducts, the line space stop magnet LSSPM is energized to cause the stopping of the record feeding means 60.

It will be remembered that the start impulse applied at the input terminal 24 causes the thyratron 50 to conduct and thereby energize the line space start magnet LSSTM. Once the thyratron 50 conducts, it remains conductive until, for instance, its plate voltage is reduced sufficiently to cut off conduction thereof. Hence, the line space start magnet LSSTM becomes energized as the thyratron 50 starts to conduct and remains energized so long as the thyratron 50 remains in conduction. Therefore, when the record feeding means 60 is to be stopped, it is necessary to de-energize the line space start magnet LSSTM as well as to energize the line space stop magnet LSSPM.

In order to de-energize the line space start magnet LSSTM upon energizing the line space stop magnet, a capacitance element 34 couples the plates of the thyratrons 40 and 50 in the usual manner so that, when thyratron 40 conducts, thyratron 50 is thereby held in a non-conductive state and, when thyratron 50 conducts, thyratron 40 is thereby held in a non-conductive state. Either thyratron 40 or 50, if in its nonconductive state, can be rendered conductive by applying a positive-going signal to its control electrode.

From the foregoing, it is seen that the start impulse or signal applied to the input terminal 24 will cause the thyratron 50 to conduct and thereby energize the line space start magnet LSSTM to start the movement of the record feeding means 60. At the same time, the start signal causes the triode 11 of the single-shot multivibrator 10 to conduct and thereby raise the potential at the anode 16 of the triode 12. The potential at anode 16 remains at the raised level for a period of time to effect single, double or triple line spacing depending upon which of the resistance elements 28a, 28b and 28c is in the circuit of the single-shot multivibrator 10. The trailing edge of the impulse coming from the single-shot multivibrator 10 causes the inverter 30 to stop conducting.

As the inverter 30 ceases to conduct, its anode voltage rises; and this rise in voltage causes the thyratron 40 to conduct and thereby energize the line space stop magnet LSSPM. Further, as the thyratron 40 conducts, its plate voltage decreases; and this decrease in voltage is capacitively coupled to the thyratron 50 by means of the capacitance element 34 so as to stop the conduction of the thyratron 50 whereby the line space start magnet LSSTM de-energizes. With the line space stop magnet LSSPM energized and the line space start magnet LSSTM de-energized, the movement of the record feeding means 60 is arrested.

The record feeding means 60 is schematically shown in Fig. 6 as a platen 70 mounted on a shaft 71. The platen 70 forms a part of a carriage mechanism, not shown, for feeding paper forms, or the like, 72 on which printing may take place.

The shaft 71 is driven by a hydraulic motor 73 supplied with fluid under pressure from a fluid pressure generating means 74. The operation of the hydraulic motor 73 is under control of valve means 75 which controls the discharge of fluid from the hydraulic motor 73 and, to a certain extent, the fluid pressure generating means 74. The valve means 75 includes a pair of spool valves 76 and 77; spool valve 76 is the line space control valve, while spool valve 77 is the paper eject control valve. The line space control valve 76 is operably controlled by the line space start and stop magnets LSSTM and LSSPM, respectively. An armature 78 pivotally mounted intermediate of its ends is associated with the line space start and stop magnets LSSTM and LSSPM and is attached at one end to the end of the line space spool valve 76. Similarly, the paper eject control valve 77 is under control of paper eject start and stop magnets 79 and 80, respectively, which operate a pivotally mounted armature 81 having one of its ends attached to the paper eject control valve 77.

Of course, paper ejection does not take place simultaneously with line spacing; therefore, during a line spacing operation, the paper eject stop magnet 80 is energized to hold the paper eject valve 77 over to the right, in the position shown in Fig. 6. Prior to a line spacing operation, the line space stop magnet LSSPM is energized and the line space control valve 76 is held over to the right, as shown in Fig. 6, to close off the right-hand chamber 82 from the central exhaust port 83 and, at the same time, connects the left-hand chamber 84 thereto. Under the conditions just mentioned, fluid under pressure supplied to the hydraulic motor 73 is prevented from flowing from the hydraulic motor 73 to the reservoir 85; however, fluid under pressure from the fluid pressure generating means 74 is permitted to bypass the hydraulic motor 73 and pass to the reservoir 85.

When the start signal causes the thyratron 50 to fire and thereby energize the line space start magnet LSSTM, the capacitively coupled thyratron 40 extinguishes and the line space stop magnet LSSPM becomes de-energized. Under these conditions, the line space control valve 76 is shifted to the left whereby the right-hand chamber 82 is connected with the central exhaust port 83 and fluid is permitted to flow from the hydraulic motor 73 to the reservoir 85; the valve 77 has not been shifted. This permits operation of the fluid motor 73 which drives the shaft 71 to advance the paper form 72.

After the start signal has been delayed by the single-shot multivibrator 10, the line space stop magnet LSSPM is again energized, the line space start magnet LSSTM is deenergized, and the valve 76 is shifted to the right to stop the operation of the fluid motor 73 and arrest the record feeding means 60. The mechanism just described for driving the record feeding means 60 is for purposes of example and further details concerning the same are contained in the patent application of H. A. Panissidi, Serial No. 479,103, filed December 31, 1954, now Patent No. 2,880,838.

The foregoing describes a particular embodiment of the invention while another embodiment is shown in Fig. 4. In the embodiment shown in Fig. 4, the start signal is simultaneously applied to single-shot multivibrators 10a, 10b and 10c as well as to the thyratron 50. The single-shot multivibrators 10a, 10b and 10c each have a different time delay period to effect single, double and triple line spacing, respectively. The single-shot multivibrators 10a, 10b and 10c are coupled to inverters 30a, 30b and 30c, respectively, in the same manner that the single-shot multivibrator 10 is coupled to the inverter 30.

The plates of the inverters 30a, 30b and 30c are respectively connected to the control electrodes of thyratrons 40a, 40b and 40c. The shield electrodes of thyratrons 40a, 40b and 40c are connectable to ground potential through a manually operated switch MOS which enables selective conditioning of the thyratrons 40a, 40b and 40c for firing or conduction. By this arrangement, only one of the thyratrons 40a, 40b and 40c will start to conduct at any one time. The line space stop magnet LSSPM is commonly connected in the plate circuits of the thyratrons 40a, 40b and 40c. Hence, when any one of the thyratrons 40a, 40b or 40c conducts, the line space stop magnet LSSPM will become energized. Further, the plates of the thyratrons 40a, 40b and 40c are capacitively coupled to the plate of the thyratron 50 by means of the capacitance 34. Therefore, when either of the line space magnets LSSTM or LSSPM are energized, the other is de-energized.

By setting the manually operated switch MOS, the machine operator can call for single, double or triple line spacing as desired. For example, if the manual switch MOS is positioned to connect the shield electrode of thyratron 40b to ground potential, thyratron 40b will be conditioned for firing upon receiving a positive-going signal at its control electrode. When the start signal is applied to the terminal 24, the thyratron 50 fires, the line space start magnet LSSTM becomes energized, the line space stop magnet LSSPM becomes de-energized, and the record feeding means 60 starts to space the paper form 72. Further, the start signal is delayed by the single-shot multivibrators 10a, 10b and 10c for periods of approximately seven, ten and thirteen milliseconds, respectively.

The output signals from the single-shot multivibrators 10a, 10b and 10c are applied to inverters 30a, 30b and 30c to stop conduction of the same at approximately seven, ten and thirteen milliseconds, respectively, after application of the start signal. As the inverters 30a, 30b and 30c stop conducting, their anode potentials rise. This rise in anode potentials is applied to the control electrodes of thyratrons 40a, 40b and 40c. However, only thyratron 40b will be in condition to conduct because it is the only thyratron of the thyratrons 40a, 40b and 40c which has its shield electrode connected to ground potential. Hence, the thyratron 40b conducts at approximately ten milliseconds after the application of the start signal. Conduction of the thyratron 40b causes the line space stop magnet LSSPM to become energized and thereby effect the arrestment of the record feeding means 60 which has line spaced the paper form 72 two line spaces.

From the above, it is seen that line space control apparatus for record feeding means has been provided which delays the start signal for a predetermined period of time to develop a stop signal which is then utilized to stop the record feeding means. Further, it is seen that the line spacing control apparatus operates independently of the record feeding means. In addition, it is seen that the line spacing of the record feeding means can be adjusted dynamically to a very precise degree by adjusting the elements for delaying the start signal. Moreover, it is seen that the means for selectively delaying the start signal for predetermined periods of time are substantially free of wear problems.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Control apparatus of the type described comprising: a start magnet, first control means for controlling the energization of said start magnet, a stop magnet, second control means for controlling the energization of said stop magnet, first circuit means for applying an electrical impulse to said first control means to cause energization of said start magnet, signal generating means for selectively generating electrical signals of different predetermined time durations in response to application of said electrical impulse, second circuit means for applying said electrical impulse to said signal generating means simultaneously with the application of the electrical impulse to said first control means, electrical coupling means for coupling said signal generating means with said second control means to operate the same at the end of the duration of the signal generated by said signal generating means so as to energize said stop magnet, and means for causing said first control means to effect de-energization of said start magnet upon energization of said stop magnet and said second control means to effect de-energization of said stop magnet upon energization of said start magnet.

2. Control apparatus of the type described comprising: a first actuator having operative and inoperative states, first control means adapted to control the state of being of said first actuator, a second actuator having operative and inoperative states, second control means adapted to control the state of being of said second actuator, first circuit means for applying an electrical impulse to said first control means to operate the same so as to render said first actuator in an operative state, signal generating means operable in response to application of said electrical impulse to selectively generate signals of different predetermined time intervals, second circuit means for applying said electrical impulse to said signal generating means, and electrical coupling means for coupling said signal generating means with said second control means to operate the same at the end of the duration of the signal generated by said signal generating means so as to render said second actuator in an operative state.

3. Line spacing control apparatus for record feeding means comprising: a start magnet, a first thyratron for controlling energization and de-energization of said start magnet, a stop magnet, a second thyratron for controlling energization and de-energization of said stop magnet, a single-shot multivibrator, a normally conducting inverter, circuit means coupling the output of said single-shot multivibrator with the input of said inverter so as to momentarily stop conduction of said inverter at the instant the output of the single-shot multivibrator falls whereby the output of said inverter rises, circuit means coupling the output of said inverter to the input of said second thyratron so that said second thyratron is rendered conductive to energize said stop magnet upon the rise of the output of said inverter, circuit means for simultaneously applying an electrical impulse to said single-shot multivibrator and said first thyratron whereby said single-shot multivibrator generates a signal starting with the application of said electrical impulse and terminating after a certain predetermined time interval and whereby said first thyratron is rendered conductive to energize said start magnet, and means for selectively varying the time interval between the start and termination of said signal generated by said single-shot multivibrator to enable the stopping of conduction of said inverter at different selected times.

4. Line spacing control apparatus for record feeding means according to claim 3 further comprising: means operative to render said second thyratron nonconductive upon said first thyratron being rendered conductive and to render said first thyratron nonconductive upon said second thyratron being rendered conductive.

5. Line spacing control apparatus for record feeding means according to claim 4 wherein said means for selectively varying the time interval between the rise and fall of the output of said single-shot multivibrator comprises: a plurality of adjustable resistances, each having a different value; and means for selectively connecting one of said plurality of resistances with said single-shot multivibrator so as to effect a certain lapse of time between the start and termination of the ouput of said single-shot multivibrator.

6. Line spacing control apparatus for record feeding means comprising: a plurality of single-shot multivibrators each having an input and an output, said multivibrators each having different time delay periods; a plurality of inverters each having an input and an output; circuit means for connecting the outputs of said multivibrators with the inputs of said inverters; means for causing said inverters to be normally conducting, a plurality of thyratrons each having at least two control electrodes, an anode and a cathode; circuit means for connecting the outputs of said inverters to one of said two control electrodes of said thyratrons; means for selectively connecting the other of said two control electrodes of one of said thyratrons to an electrical potential to condition the same for firing; magnetic means commonly connected to the plates of said thyratrons so as to be energized upon the firing of any one of said thyratrons; and means for simultaneously applying an electrical impulse to the inputs of said plurality of multivibrators, said multivibrators, upon receiving an electrical impulse, providing output signals starting at the same time and terminating at different predetermined periods of time to stop conduction of said inverters at different periods of time whereby the thyratron conditioned for firing will fire when the inverter associated therewith stops conducting.

7. Line spacing control apparatus for record feeding devices comprising: a plurality of single-shot multivibrators each having an output and an input and a different time delay period, first magnetic means, a first thyratron for controlling the energization and de-energization of said first magnetic means, circuit means for simultaneously applying an electrical impulse to said plurality of single-shot multivibrators and said first thyratron whereby each of said single-shot multivibrators generates an output signal starting at the same time but terminating at different times and whereby said first thyratron is rendered conductive to energize said first magnetic means, a plurality of normally conducting inverters connected to said single-shot multivibrators so as to stop conducting upon termination of said signals generated by said multivibrators, a plurality of second thyratrons, means for selectively conditioning said plurality of second thyratrons for firing, circuit means connecting said plurality of inverters to said plurality of second thyratrons whereby the thyratron conditioned for firing will fire when the inverter associated therewith stops conducting as a result of the termination of the signal applied thereto from the associated single-shot multivibrator, second magnetic means connected to be controlled by any one of said plurality of second thyratrons, and means for causing said first thyratron to extinguish upon any of said plurality of second thyratrons firing and for causing the extinguishment of any of said plurality of second thyratrons upon said first thyratron firing.

8. Line spacing control apparatus for record feeding devices comprising: a single-shot multivibrator having an input and an output, means for applying an electrical impulse to the input of said single-shot multivibrator to cause the same to generate at the output thereof a signal starting upon the application of the electrical impulse and terminating after a predetermined lapse of time, a normally conducting inverter connected to the output of said single-shot multivibrator so as to momentarily stop conducting upon the termination of the signal generated by said single-shot multivibrator, a thyratron coupled to said inverter to be rendered conductive upon said inverter becoming nonconductive, means for varying the termination of the signal generated by said single-shot multivibrator to change the time that said inverter becomes nonconductive, and means for selectively controlling said varying means.

9. Line spacing control apparatus according to claim 8 wherein said means for varying the termination of the signal generated by said single-shot multivibrator comprises a plurality of resistance elements, and said means for selectively controlling said varying means comprises means for selectively connecting said resistance elements with said single-shot multivibrator to vary the time delay period thereof.

10. Line spacing control apparatus for record feeding devices comprising: an element for generating a signal having a predetermined duration upon receiving an electrical impulse, means for applying an electrical impulse to said element, signal generating means operable for generating a signal in response to the termination of the signal generated by said element, means for varying the duration of the signal generated by said element to vary the time when said signal generating means generates a signal, and means for selectively controlling said varying means.

11. In a record feeding device, a magnetically controlled record advancing means, a start magnet for controlling the starting of said record advancing means, a stop magnet for controlling the stopping of said record advancing means, a first thyratron for controlling energization and de-energization of said start magnet, a second thyratron for controlling energization and de-energization of said stop magnet, a single-shot multivibrator adapted to generate a signal having a predetermined time duration starting upon the application of an electrical impulse, means for selectively varying the duration of the signal generated by said single-shot multivibrator, a normally conducting inverter, first circuit means for connecting said inverter with said single-shot multivibrator whereby said inverter stops conducting upon termination of the signal generated by said single-shot multivibrator, second circuit means for connecting said inverter with said second thyratron to start conduction of the same the instant said inverter stops conducting, third circuit means for simultaneously applying an electrical impulse to said first thyratron to cause the same to conduct and thereby energize said start magnet and to said single-shot multivibrator to cause the same to generate a signal of a selected predetermined time duration whereupon termination of the signal causes said inverter to stop conducting thereby causing conduction of said second thyratron to energize said stop magnet, and means for causing said first thyratron to stop conducting upon conduction of said second thyratron and said second thyratron to stop conducting upon conduction of said first thyratron.

12. In a record feeding device, a magnetically controlled record advancing means; a start magnet for controlling the starting of said record advancing means; a stop magnet for controlling the stopping of said record advancing means; a first thyratron normally conditioned for conduction to control energization and de-energization of said start magnet; a plurality of second thyratrons, each connected to control the energization and de-energization of said stop magnet; means for selectively conditioning said plurality of second thyratrons for conduction; a plurality of single-shot multivibrators, each adapted to generate a signal having a predetermined time duration starting upon the application of an electrical impulse; a plurality of normally conducting inverters; first circuit means for connecting said plurality of inverters with said plurality of single-shot multivibrators whereby each inverter becomes associated with one of the single-shot multivibrators and momentarily stops conducting upon termination of the signal generated by said associated single-shot multivibrator; second circuit means for connecting said plurality of inverters with said plurality of second thyratrons whereby each inverter becomes associated with one of the second thyratrons to start conduction of the same the instant the associated inverter stops conducting if said one of the second thyratrons is conditioned for conduction; third circuit means for simultaneously applying an electrical impulse to said first thyratron to cause the same to conduct and thereby energize said start magnet and to said plurality of single-shot multivibrators to cause the same to generate signals of different predetermined time durations, whereupon termination of said signals causes said plurality of inverters to stop conducting thereby causing conduction of the associated second thyratron conditioned for conduction to energize said stop magnet; and means for causing said first thyratron to stop conducting upon conduction of any of said plurality of second thyratrons and any of said plurality of second thyratrons to stop conducting upon conduction of said first thyratron.

References Cited in the file of this patent

UNITED STATES PATENTS

| | | |
|---|---|---|
| 2,659,008 | Floyd | Nov. 10, 1953 |
| 2,747,717 | Cunningham et al. | May 29, 1956 |